US009900763B2

(12) United States Patent
Adachi et al.

(10) Patent No.: US 9,900,763 B2
(45) Date of Patent: Feb. 20, 2018

(54) USER TERMINAL FOR DETERMINING WHETHER TO TRANSMIT SYNCHRONIZATION SIGNAL IN RESPONSE TO A RECEIVED POWER

(71) Applicant: KYOCERA CORPORATION, Kyoto (JP)

(72) Inventors: Hiroyuki Adachi, Kawasaki (JP); Takahiro Saiwai, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/050,989

(22) Filed: Feb. 23, 2016

(65) Prior Publication Data

US 2016/0174060 A1 Jun. 16, 2016

Related U.S. Application Data

(63) Continuation of application No. PCT/JP2015/063240, filed on May 7, 2015.

(30) Foreign Application Priority Data

May 9, 2014 (JP) .................................. 2014-097308

(51) Int. Cl.
*H04L 29/06* (2006.01)
*H04W 8/00* (2009.01)
*H04W 92/18* (2009.01)
*H04W 52/02* (2009.01)
(Continued)

(52) U.S. Cl.
CPC ....... *H04W 8/005* (2013.01); *H04L 29/08306* (2013.01); *H04W 52/0245* (2013.01); *H04W 56/001* (2013.01); *H04W 92/18* (2013.01); *H04L 67/104* (2013.01)

(58) Field of Classification Search
CPC .............. H04L 67/104; H04L 67/1061; H04L 29/08306; H04W 4/005; H04W 28/0215
See application file for complete search history.

(56) References Cited

U.S. PATENT DOCUMENTS

| | | | |
|---|---|---|---|
| 2008/0002658 A1* | 1/2008 | Soliman .............. | H04W 76/023 370/343 |
| 2014/0301285 A1* | 10/2014 | Ahn ...................... | H04W 48/12 370/329 |
| 2017/0013578 A1* | 1/2017 | Wei ....................... | H04W 8/005 |

(Continued)

FOREIGN PATENT DOCUMENTS

| | | |
|---|---|---|
| JP | 2010-041648 A | 2/2010 |
| JP | 2011-130157 A | 6/2011 |
| JP | 2013-258625 A | 12/2013 |

OTHER PUBLICATIONS

R1-141549, "Analysis of different RSRP thresholds for design and evaluation of D2D communication", Mar. 31-Apr. 4, 2014.*

(Continued)

*Primary Examiner* — Salvador E Rivas
(74) *Attorney, Agent, or Firm* — Studebaker & Brackett PC (57) ABSTRACT

User terminal comprises a transmitter configured to transmit, in response to a received power of a signal from another user terminal satisfying a predetermined condition, direct communication in a proximity service without transmitting a synchronization signal in the proximity service, in a case where the user terminal is out of a network coverage.

3 Claims, 7 Drawing Sheets (51) Int. Cl.
  *H04W 56/00* (2009.01)
  *H04L 29/08* (2006.01)

(56) References Cited

U.S. PATENT DOCUMENTS

2017/0013580 A1* 1/2017 Kim .................. H04W 56/00
2017/0142741 A1* 5/2017 Kaur ................. H04W 72/121

OTHER PUBLICATIONS

R1-141314, "D2D Synchronization Signal relay by UE", Mar. 31-Apr. 4, 2014.*
R1-141314, "D2D Synchronization Signal relay by UE", Mar.31-Apr. 4, 2014.*
International Search Report issued in PCT/JP2015/063240; dated Jul. 7, 2015.
Written Opinion issued in PCT/JP2015/063240; dated Jul. 7, 2015.
3rd Generation Partnership Project; Technical Specification Group RAN; Study on LTE Device to Device Proximity Services—Radio Aspects; 3GPP TR 36.843; V1.0.0; Nov. 2013; pp. 1-32; Release 12; 3GPP Organizational Partners.
Ericsson; "Synchronization Procedures for D2D Discovery and Communication"; 3GPP TSG RAN WG1 Meeting #76bis; R1-141381; Mar. 31-Apr. 4, 2014; pp. 1-5; Shenzhen, China.
The extended European search report issued by the European Patent Office on Sep. 14, 2017, which corresponds to European Patent Application No. 15789875.0-1854 and is related to U.S. Appl. No. 15/050,989.
LG Electronics Inc.; Discussion on Synchronization for D2D Communications; 3GPP TSG-RAN WG1 Meeting #75; R1-135488; Nov. 11-15, 2013; pp. 1-7; San Francisco, USA.

* cited by examiner

D2D Transmission procedure 1

USER TERMINAL FOR DETERMINING WHETHER TO TRANSMIT SYNCHRONIZATION SIGNAL IN RESPONSE TO A RECEIVED POWER

RELATED APPLICATIONS

This application is a continuation application of international application PCT/JP2015/063240, filed May 7, 2015, which claims benefit of Japanese Patent Application No. 2014-097308 (filed on May 9, 2014), the entirety of both applications hereby expressly incorporated by reference.

TECHNICAL FIELD

The present invention relates to a user terminal used in a mobile communication system.

BACKGROUND ART

In 3GPP (3rd Generation Partnership Project) which is a project aiming to standardize a mobile communication system, the introduction of Device-to-Device (D2D) communication is discussed as a new function after Release 12 (see Non Patent Literature 1).

The D2D proximity service is a service enabling direct communication within a synchronization cluster consisting of a plurality of synchronized user terminals without passing through a network. The D2D proximity service includes a discovery process (Discovery) in which a proximal terminal is discovered and a communication process (D2D communication) in which direct communication is performed.

CITATION LIST

Non Patent Literature

[NPL 1] 3GPP Technical Report "TR 36.843 V1.0.0" Jan. 16, 2014

SUMMARY OF INVENTION

A user terminal according to one embodiment comprises a transmitter configured to transmit, in response to a received power of a signal from another user terminal satisfying a predetermined condition, direct communication in a proximity service without transmitting a synchronization signal in the proximity service, in a case where the user terminal is out of a network coverage.

A user terminal according to one embodiment comprises a controller configured to determine, on the basis of a signal power intensity from another user terminal, whether or not the another user terminal synchronized with the user terminal is present in the neighborhood, when the user terminal is out of a network coverage.

A user terminal according to one embodiment comprises a controller configured to determine, on the basis of a signal power intensity from another user terminal, whether or not to transmit a synchronization signal in a proximity service, when the user terminal is out of a network coverage.

A user terminal according to one embodiment comprises a controller configured to start, on the basis of a signal power intensity from another user terminal, direct communication in a proximity service without transmitting a synchronization signal in the proximity service, when the user terminal is out of a network coverage.

A user terminal according to one embodiment comprises a controller configured to start, on the basis of a signal power intensity from a cell, a proximity service without transmitting a synchronization signal in the proximity service, when the user terminal is in a coverage of the cell.

A user terminal according to one embodiment comprises a transmitter configured to transmit a synchronization signal for D2D and a predetermined signal for D2D used for a D2D proximity service; and a controller configured to monitor a reception status of the synchronization signal and the predetermined signal, wherein when the user terminal is out of a network coverage, when the transmitter transmits the synchronization signal and when the controller receives neither the synchronization signal nor the predetermined signal from another user terminal, it is determined that the another user terminal synchronized with the user terminal is not present in the neighborhood.

A user terminal according to one embodiment comprise a transmitter configured to transmit a synchronization signal for D2D and a predetermined signal for D2D used for a D2D proximity service; and a controller configured to monitor a reception status of the synchronization signal and the predetermined signal, wherein when the user terminal is out of a network coverage, the controller determines whether or not the another user terminal synchronized with the user terminal is present in the neighborhood, from a signal power intensity of the synchronization signal or the predetermined signal acquired by monitoring a reception status for a predetermined period.

A user terminal according to one embodiment comprise a transmitter configured to transmit a synchronization signal for D2D and a predetermined signal for D2D used for a D2D proximity service; a receiver configured to monitor a reception status of the synchronization signal and the predetermined signal; and a controller configured to request a radio base station to permit a transmission stop of the synchronization signal, wherein where the user terminal is in a network coverage of the radio base station, when the transmitter transmits the synchronization signal and when the receiver does not receive the predetermined signal from another user terminal, the controller determines that the another synchronized user terminal is not present in the neighborhood, and requests the radio base station to permit the transmission stop of the synchronization signal.

A user terminal according to one embodiment comprises a transmitter configured to transmit a synchronization signal for D2D and a predetermined signal for D2D used for a D2D proximity service; and a controller configured to monitor a reception status of the synchronization signal and the predetermined signal, wherein when the controller receives a synchronization signal from a base station or another user terminal, the transmitter transmits a predetermined signal and starts the D2D proximity service even when the transmitter does not transmit a synchronization signal.

A user terminal according to one embodiment comprises a transmitter configured to transmit a synchronization signal for D2D and a predetermined signal for D2D used for a D2D proximity service; and a controller configured to monitor a reception status of the synchronization signal and the predetermined signal, wherein when transmitting the synchronization signal continuously for a predetermined period, the transmitter transmits a signal notifying a transmission stop of the synchronization signal and stops transmitting the synchronization signal.

DESCRIPTION OF EMBODIMENTS

Overview of Embodiment

A user terminal according to one embodiment comprises a transmitter configured to transmit, in response to a received power of a signal from another user terminal satisfying a predetermined condition, direct communication in a proximity service without transmitting a synchronization signal in the proximity service, in a case where the user terminal is out of a network coverage.

A user terminal according to one embodiment comprises a transmitter configured to transmit, in response to a received power of a signal from a cell satisfying a predetermined condition, a discovery signal for discovering another user terminal in a proximity service without transmitting a synchronization signal in the proximity service, in a case where the user terminal is in a coverage of the cell.

A user terminal according to one embodiment comprises a transmitter configured to transmit, in response to a received power of a signal from a cell satisfying a predetermined condition, direct communication in a proximity service without transmitting a synchronization signal in the proximity service, in a case where the user terminal is in a coverage of the cell.

An apparatus according to one embodiment is for controlling a user terminal. The apparatus comprises a processor configured to perform a process of transmitting, in response to a received power of a signal from another user terminal satisfying a predetermined condition, direct communication in a proximity service without transmitting a synchronization signal in the proximity service, in a case where the user terminal is out of a network coverage.

A user terminal according to a first embodiment comprises a controller configured to determine, on the basis of a signal power intensity from another user terminal, whether or not the another user terminal synchronized with the user terminal is present in the neighborhood, when the user terminal is out of a network coverage.

A user terminal according to a first embodiment comprises a controller configured to determine, on the basis of a signal power intensity from another user terminal, whether or not to transmit a synchronization signal in a proximity service, when the user terminal is out of a network coverage.

A user terminal according to a third embodiment comprises a controller configured to start, on the basis of a signal power intensity from another user terminal, direct communication in a proximity service without transmitting a synchronization signal in the proximity service, when the user terminal is out of a network coverage.

A user terminal according to a third embodiment comprises a controller configured to start, on the basis of a signal power intensity from a cell, a proximity service without transmitting a synchronization signal in the proximity service, when the user terminal is in a coverage of the cell.

The controller starts transmitting a discovery signal for discovering another user terminal as the proximity service.

The controller starts direct communication as the proximity service.

Here, in the mobile communication system, a user terminal generally performs communication by control (or assistance) from a network.

However, the D2D proximity service is assumed to be available even out of a coverage of a network. Out of a coverage of a network, the control (or assistance) from a network is not available, and thus, it is difficult to appropriately use the D2D proximity service.

Therefore, an object is to provide a user terminal and a mobile communication method with which it is possible to appropriately use the D2D proximity service even out of a coverage of a network.

A user terminal according to a first embodiment comprise a transmitter configured to transmit a synchronization signal for D2D and a predetermined signal for D2D used for a D2D proximity service; and a controller configured to monitor a reception status of the synchronization signal and the predetermined signal, wherein when the user terminal is out of a network coverage, when the transmitter transmits the synchronization signal and when the controller receives neither the synchronization signal nor the predetermined signal from another user terminal, it is determined that the another user terminal synchronized with the user terminal is not present in the neighborhood.

The user terminal according to the first embodiment comprise a transmitter configured to transmit a synchronization signal for D2D and a predetermined signal for D2D used for a D2D proximity service; and a controller configured to monitor a reception status of the synchronization signal and the predetermined signal, wherein when the user terminal is out of a network coverage, the controller determines whether or not the another user terminal synchronized with the user terminal is present in the neighborhood, from a signal power intensity of the synchronization signal or the predetermined signal acquired by monitoring a reception status for a predetermined period.

The user terminal according to the first embodiment, wherein when it is determined that the another synchronized user terminal is not present in the neighborhood, it is controlled so as to not transmit the predetermined signal or to lower a frequency of transmission of the predetermined signal.

The user terminal according to the first embodiment, wherein when it is determined that the another synchronized user terminal is not present in the neighborhood, it is controlled so as to not transmit the synchronization signal or to lower a frequency of transmission of the synchronization signal.

The user terminal according to the first embodiment lowers the frequency of transmission of the synchronization signal so as to not exceed a period during which the another user terminal monitors a reception status of the synchronization signal.

The user terminal according to the first embodiment, wherein when determining that the another user terminal is not present in the neighborhood, the transmitter broadcasts a request signal requesting a response, and when receiving a response signal to the broadcast from the another user terminal, the user terminal newly determines that the synchronized other user terminal is present in the neighborhood.

In the user terminal according to the first embodiment, the controller receives a response signal indicating the synchronization from the another user terminal that receives the request signal.

In the user terminal according to the first embodiment, when the controller receives the response signal from the another user terminal, the transmitter broadcasts a notification signal indicating that another user terminal synchronized with the user terminal is present.

In the user terminal according to the first embodiment, the another user terminal is instructed, by the notification signal, to stop transmitting at least one of the response signal and the synchronization signal.

A user terminal according to a second embodiment comprises a transmitter configured to transmit a synchronization signal for D2D and a predetermined signal for D2D used for a D2D proximity service; a receiver configured to monitor a reception status of the synchronization signal and the predetermined signal; and a controller configured to request a radio base station to permit a transmission stop of the synchronization signal, wherein where the user terminal is in a network coverage of the radio base station, when the transmitter transmits the synchronization signal and when the receiver does not receive the predetermined signal from another user terminal, the controller determines that the another synchronized user terminal is not present in the neighborhood, and requests the radio base station to permit the transmission stop of the synchronization signal.

In the user terminal according to the second embodiment, the receiver receives a signal indicating an implementation status of the D2D proximity service from the another user terminal synchronized with the user terminal.

In the user terminal according to the second embodiment, when the receiver receives a notification indicating being out of a network coverage from the another user terminal, the controller determines that the another user terminal and the user terminal are synchronized.

In the user terminal according to the second embodiment, when the another user terminal uses a radio resource for the D2D proximity service for a user terminal that is out of a network coverage to transmit a signal for the D2D proximity service, the user terminal determines that the another user terminal is synchronized with the user terminal.

A user terminal according to a third embodiment comprises a transmitter configured to transmit a synchronization signal for D2D and a predetermined signal for D2D used for a D2D proximity service; and a controller configured to monitor a reception status of the synchronization signal and the predetermined signal, wherein when the controller receives a synchronization signal from a base station or another user terminal, the transmitter transmits a predetermined signal and starts the D2D proximity service even when the transmitter does not transmit a synchronization signal.

A user terminal according to a fourth embodiment comprise a transmitter configured to transmit a synchronization signal for D2D and a predetermined signal for D2D used for a D2D proximity service; and a controller configured to monitor a reception status of the synchronization signal and the predetermined signal, wherein when transmitting the synchronization signal continuously for a predetermined period, the transmitter transmits a signal notifying a transmission stop of the synchronization signal and stops transmitting the synchronization signal.

In the user terminal according to the first to fourth embodiment, the predetermined signal is at least one of a control signal for discovering the another user terminal, a radio resource designation signal for the D2D proximity service, and user data for the D2D proximity service.

First Embodiment

Hereinafter, description will be provided for an embodiment in which the present invention is applied to an LTE system.

(System Configuration)

Figure 1:
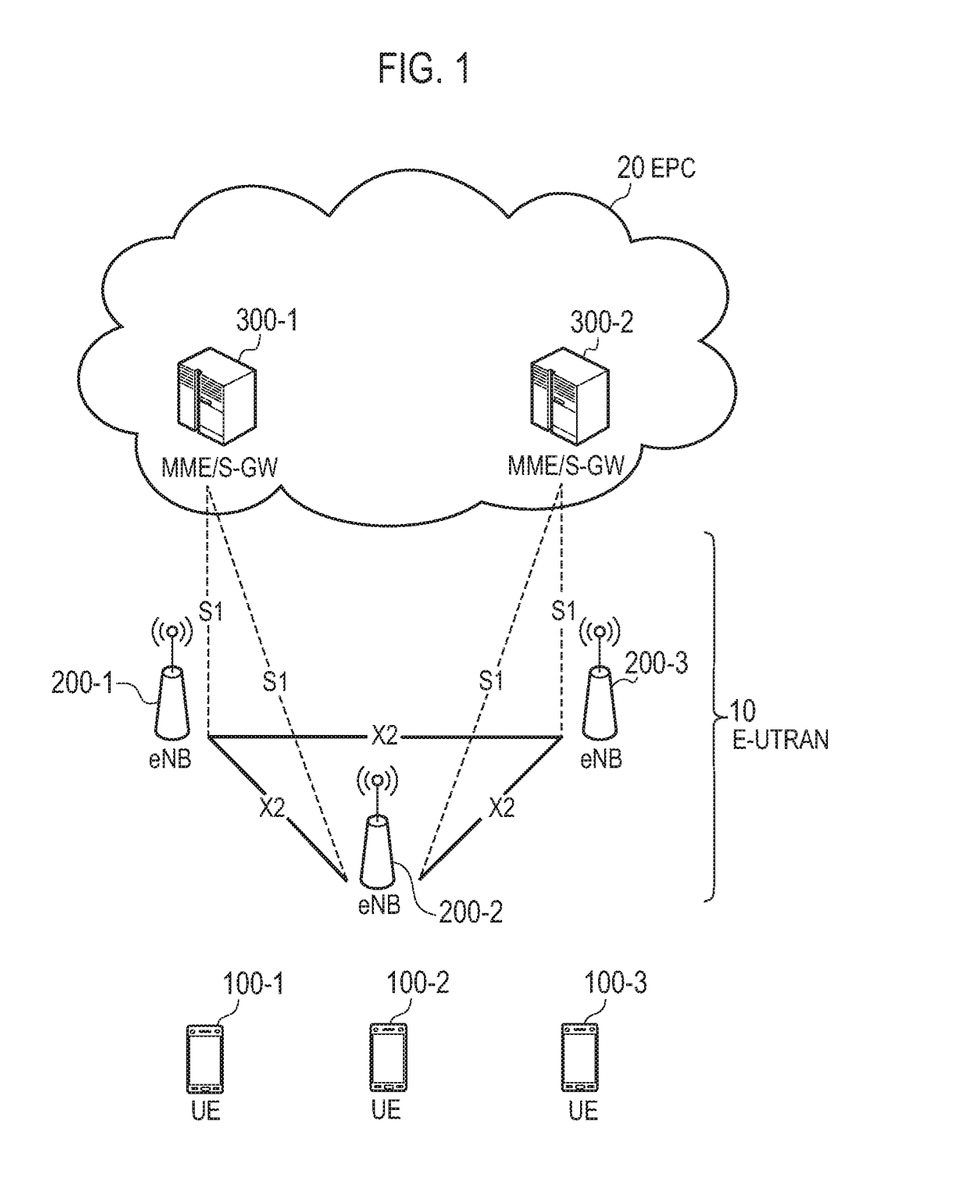
FIG. 1 is a configuration diagram of an LTE system according to a first embodiment to a third embodiment.

FIG. 1 is a configuration diagram of the LTE system according to the first embodiment. As shown in FIG. 1, the LTE system according to the first embodiment includes a UE (User Equipment) 100, an E-UTRAN (Evolved-UMTS Terrestrial Radio Access Network) 10, and an EPC (Evolved Packet Core) 20.

The UE 100 corresponds to a user terminal. The UE 100 is a mobile communication device, which performs radio communication with a cell (serving cell) with which connection is established. The configuration of the UE 100 will be described later.

The E-UTRAN 10 corresponds to a radio access network. The E-UTRAN 10 includes an eNB 200 (evolved Node-B). The eNB 200 corresponds to a base station. The eNBs 200 are connected mutually via an X2 interface. The configuration of the eNB 200 will be described later.

The eNB 200 manages one or a plurality of cells, and performs radio communication with the UE 100 which establishes a connection with a cell of the eNB 200. The eNB 200 has a radio resource management (RRM) function, a routing function of user data, a measurement control function for mobility control and scheduling, and the like. The "cell" is used as a term indicating a smallest unit of a radio communication area, and is also used as a term indicating a function of performing radio communication with the UE 100.

The EPC 20 corresponds to a core network. A network of the LTE system is configured by the E-UTRAN 10 and the EPC 20. The EPC 20 includes an MME (Mobility Management Entity)/S-GW (Serving-Gateway) 300. The MME performs various types of mobility control and the like for the UE 100. The SGW performs transfer control of the user data. The MME/S-GW 300 is connected to the eNB 200 via an S1 interface.

Figure 2:
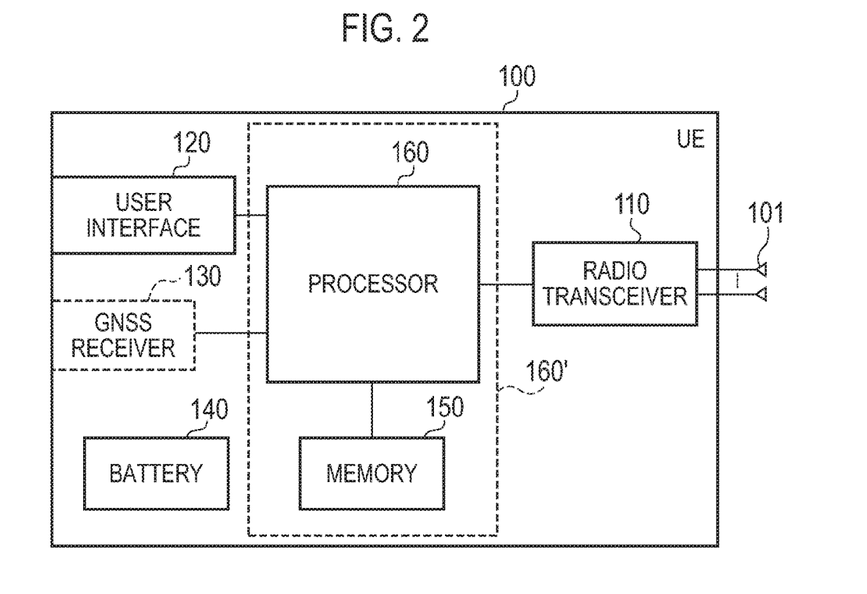
FIG. 2 is a block diagram of a UE according to the first embodiment to the third embodiment.

FIG. 2 is a block diagram of the UE 100. As shown in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 corresponds to a memory unit and the processor 160 corresponds to a controller. The UE 100 may not have the GNSS receiver 130. Furthermore, the memory 150 may be integrally formed with the processor 160, and this set (that is, a chip set) may be called a processor 160'.

The antennas 101 and the radio transceiver 110 are used to transmit or receive a radio signal. The radio transceiver 110 converts a baseband signal (transmission signal) output from the processor 160 into a radio signal, and transmits the radio signal from the antennas 101. Furthermore, the radio transceiver 110 converts the radio signal received by the antennas 101 into a baseband signal (reception signal), and outputs the baseband signal to the processor 160.

The user interface 120 is an interface with a user carrying the UE 100, and includes a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, coding and decoding, and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
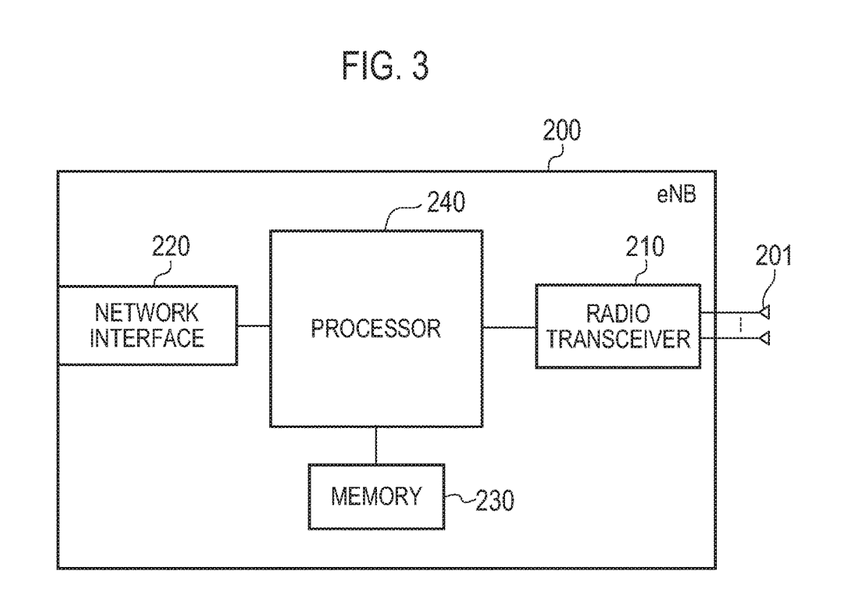
FIG. 3 is a block diagram of an eNB according to the first embodiment to the third embodiment.

FIG. 3 is a block diagram of the eNB 200. As shown in FIG. 3, the eNB 200 includes a plurality of antennas 201, a radio transceiver 210, a network interface 220, a memory 230, and a processor 240.

The antennas 201 and the radio transceiver 210 are used to transmit or receive a radio signal. The radio transceiver 210 converts a baseband signal (transmission signal) output from the processor 240 into a radio signal, and transmits the radio signal from the plurality of antennas 201. Furthermore, the radio transceiver 210 converts the radio signal received by the plurality of antennas 201 into a baseband signal (reception signal), and outputs the baseband signal to the processor 240.

The network interface 220 is connected to a neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes a baseband processor that performs modulation and demodulation, coding and decoding, and the like on the baseband signal, and a CPU that performs various types of processes by executing the program stored in the memory 230. The processor 240 executes various types of processes and various types of communication protocols described later.

Figure 4:
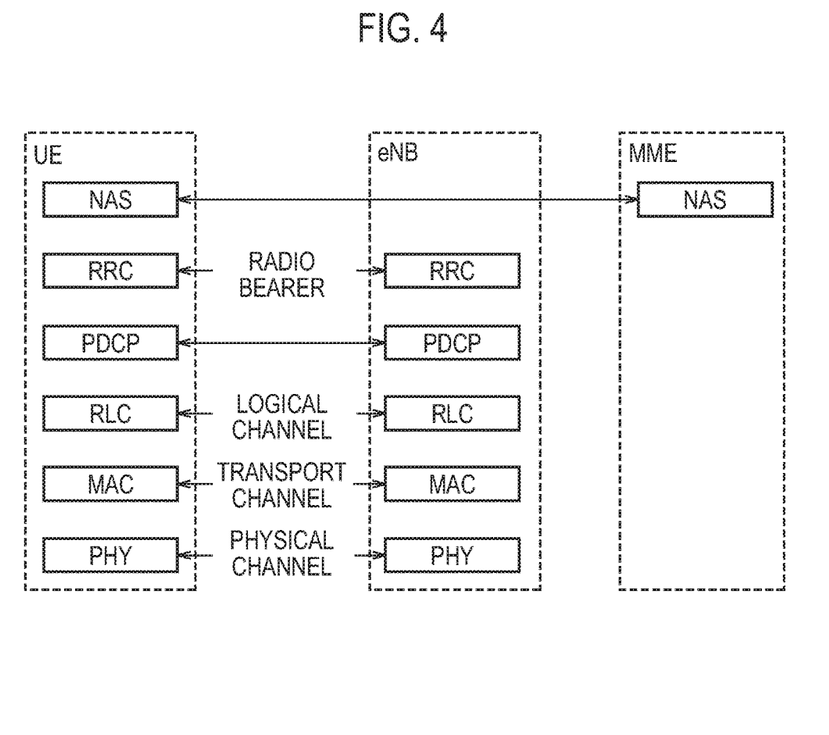
FIG. 4 is a protocol stack diagram of a radio interface according to the first embodiment to the third embodiment.

FIG. 4 is a protocol stack diagram of a radio interface in the LTE system. As shown in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding and decoding, modulation and demodulation, antenna mapping and demapping, and resource mapping and demapping. Between the physical layer of the UE 100 and the physical layer of the eNB 200, user data and control signals are sent via a physical channel.

The MAC layer performs priority control of data, and a retransmission process and the like by a hybrid ARQ (HARQ). Between the MAC layer of the UE 100 and the MAC layer of the eNB 200, user data and control signals are sent via a transport channel. The MAC layer of the eNB 200 includes a scheduler for deciding a transport format (a transport block size and a modulation and coding scheme) of an uplink and a downlink, and deciding (scheduling) a resource block to be assigned to the UE 100.

The RLC layer sends data to an RLC layer of a reception side by using the functions of the MAC layer and the physical layer. Between the RLC layer of the UE 100 and the RLC layer of the eNB 200, user data and control signals are sent via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (RRC message) for various types of settings is sent. The RRC layer controls the logical channel, the transport channel, and the physical channel according to the establishment, re-establishment, and release of a radio bearer. When a connection (RRC connection) is established between the RRC of the UE 100 and the RRC of the eNB 200, the UE 100 is in a connected state (RRC connected state), and when the connection is not established, the UE 100 is in an idle state (RRC idle state).

An NAS (Non-Access Stratum) layer positioned above the RRC layer performs session management, mobility management, and the like.

Figure 5:
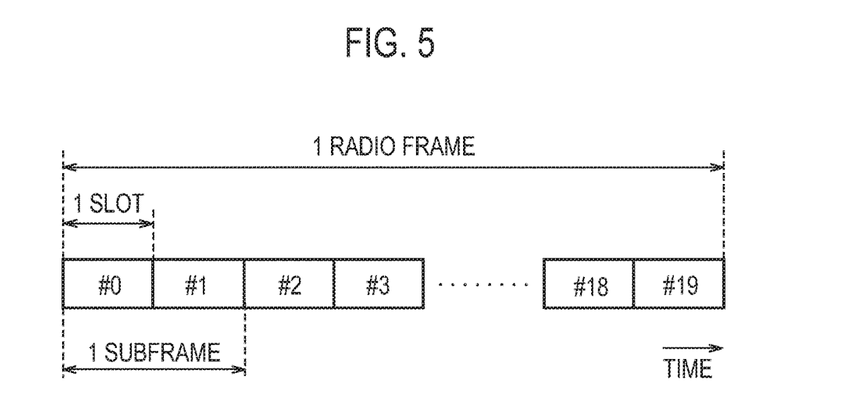
FIG. 5 is a configuration diagram of a radio frame according to the first embodiment to the third embodiment.

FIG. 5 is a configuration diagram of a radio frame used in the LTE system. In the LTE system, OFDMA (Orthogonal Frequency Division Multiple Access) is applied to a downlink (DL), and SC-FDMA (Single Carrier Frequency Division Multiple Access) is applied to an uplink (UL), respectively.

As shown in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each of the resource blocks includes a plurality of subcarriers in the frequency direction. A resource element is configured by one subcarrier and one symbol.

Of the radio resources assigned to the UE 100, a frequency resource is configured by a resource block, and a time resource is configured by a subframe (or a slot).

In the downlink, an interval of several symbols at the head of each subframe is a region used as a physical downlink control channel (PDCCH) for mainly transmitting the downlink control signal. Furthermore, the remaining portion of each subframe is a region available as a physical downlink shared channel (PDSCH) for mainly transmitting downlink user data.

In the uplink, both ends in the frequency direction of each subframe are regions used as a physical uplink control channel (PUCCH) for mainly transmitting the uplink control signal. The remaining portion in each subframe is a region available as a physical uplink shared channel (PUSCH) for mainly transmitting uplink user data.

(D2D Proximity Service)

A summary of the D2D proximity service (D2D ProSe) will be described, below.

An LTE system according to a first embodiment supports the D2D proximity service. The D2D proximity service is a service enabling direct communication within a synchronization cluster consisting of a plurality of synchronized user terminals without passing through a network. The D2D proximity service includes a discovery process (Discovery) in which a proximal terminal is discovered and a communication process (D2D communication) in which direct communication is performed. The D2D communication is also called Direct communication.

A scenario in which all the UEs 100 forming the synchronization cluster are in a cell coverage is called "in a network coverage or In coverage (InC)". A scenario in which all the UEs 100 forming the synchronization cluster are out of a cell coverage is called "out of a network coverage or Out of coverage (OoC)". A scenario in which some UEs 100 in the synchronization cluster are in a cell coverage and the remaining UEs 100 are out of the cell coverage is called "partial network coverage or Partial coverage".

Figure 6:
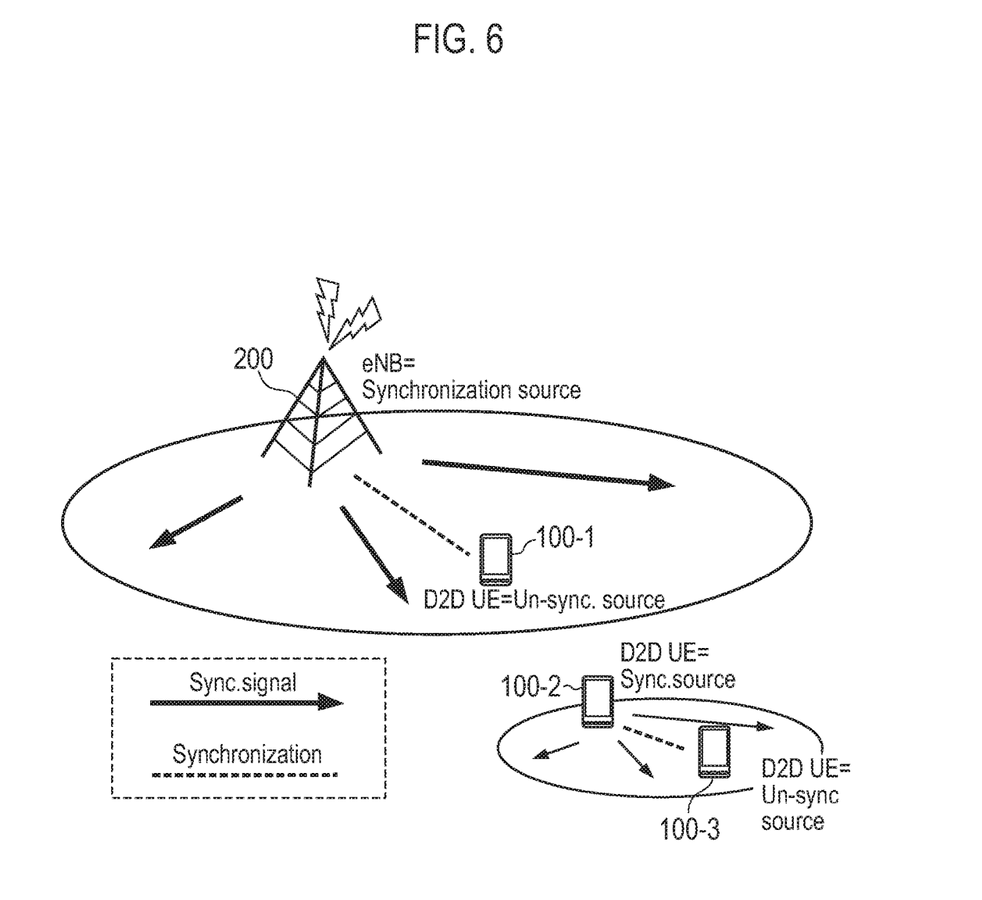
FIG. 6 is a diagram for describing each scenario in a coverage and out of a coverage according to the first embodiment to the third embodiment.

FIG. 6 is a diagram for describing each scenario in a network coverage and out of a network coverage.

As shown in FIG. 6, in the network coverage, the eNB 200 is a D2D synchronization source. In the first embodiment, the D2D synchronization source indicates a node from which a D2D synchronization signal (D2DSS) is transmitted (Synchronization source). Further, a D2D un-synchronization source indicates a node (Un-Synchronization source) from which the D2D synchronization signal is not transmitted and which synchronizes with the D2D synchronization source.

In the network coverage, the eNB 200 that is a D2D synchronization source transmits, by a broadcast signal, a synchronization signal used for the D2D proximity service, D2D resource information (SA: Scheduling Assignment) indicating an available radio resource, etc. The D2D resource information may be information indicating a radio resource for Discovery (hereinafter, referred to as "Discovery resource") and information indicating a radio resource for D2D communication (hereinafter, referred to as "Communication resource").

The UE 100-1 that is a D2D un-synchronization source performs the Discovery and the D2D communication on the basis of the D2D resource information received from the eNB 200.

On the other hand, out of the network coverage, the eNB 200 is not capable of performing the above operation, and thus, a predetermined UE 100 (in FIG. 6, UE 100-2) is a D2D synchronization source. The UE 100-2 that is a D2D synchronization source transmits the synchronization signal and the D2D resource information by a broadcast signal. A UE 100-3 that is a D2D un-synchronization source performs the Discovery and the D2D communication on the basis of the D2D resource information received from the eNB 200.

The UE 100 transmits a synchronization signal for D2D and a predetermined signal for D2D. Further, the UE 100 performs monitoring a reception status of the synchronization signal for D2D and the predetermined signal for D2D. It is noted that a predetermined signal includes a control signal (Discovery signal) for discovering another user terminal, a radio resource designation signal (SA: Scheduling Assignment) for the D2D proximity service, and user data (Communication Data) for the D2D proximity service.

(Operation to Determine Whether Another UE 100 is Present in the Neighborhood)

In the D2D proximity service when the UE 100 transmits a synchronization signal, no operation is defined where no response is received from another UE 100.

Thus, even when not receiving the response from another UE 100, the UE 100 continues to transmit the synchronization signal, possibly resulting in a wasteful power consumption of the UE 100.

In the present embodiment, to resolve the above-described problem, when the UE 100 is out of the network coverage, the UE 100 transmits the synchronization signal, and when receiving neither the synchronization signal nor the predetermined signal from another UE 100, the UE 100 determines that another UE 100 synchronized with the UE 100 is not present in the neighborhood.

Here, the UE 100 may determine whether another UE 100 synchronized with the UE 100 is present from a signal intensity such as the synchronization signal and the predetermined signal from the another UE 100 rather than from the reception status of the synchronization signal.

(Operation when Determining that Another UE 100 is not Present in the Neighborhood)

When determining that the another synchronized UE 100 is not present in the neighborhood, the UE 100 does not transmit the predetermined signal or control to lower a frequency of transmission of the predetermined signal.

Further, when determining that the another synchronized UE 100 is not present in the neighborhood, the UE 100 does not transmit the synchronization signal or control to lower a frequency of transmission of the synchronization signal.

Here, when lowering the frequency of transmission of the synchronization signal, the UE 100 lowers frequency of transmission of the synchronization signal so as not to exceed a predetermined period during which the another UE 100 monitors the reception status of the synchronization signal. This is to allow the another UE 100 to receive the synchronization signal.

Figure 7:
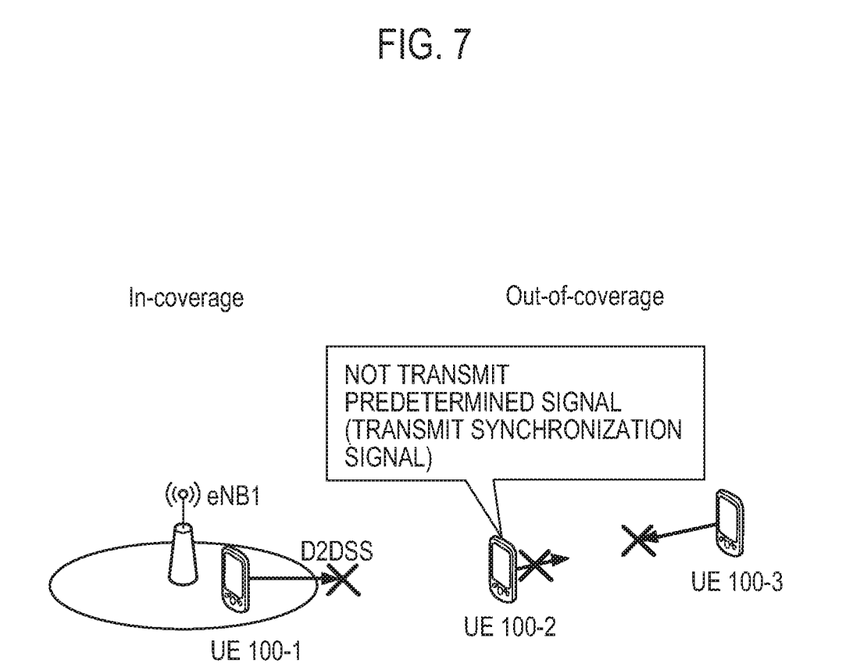
FIG. 7 is a configuration diagram according to the first embodiment.

FIG. 7 shows an example of an operation according to the present embodiment. When not receiving the predetermined signal and the synchronization signal from the another UEs 100 (UE 100-1 and UE 100-3), the UE 100-2 that is out of the network coverage transmits the synchronization signal only rather than transmitting the predetermined signal. When receiving the predetermined signal transmitted from the another UE 100, the UE 100-2 transmits the predetermined signal and implements the D2D proximity service.

(Operation Encouraging Response from Another UE 100 in the Neighborhood)

When determining that another UE 100 is not present in the neighborhood, the UE 100 broadcasts a request signal requesting a response. When receiving, from another UE 100, a response signal to the broadcast, the UE 100 newly determines that the synchronized other user terminal is present in the neighborhood.

It is noted that the UE 100 may broadcast the request signal before determining whether another UE 100 is present in the neighborhood.

Another UE 100 that receives the request signal transmits a response signal indicating synchronization with the UE 100.

When receiving the response indicating the synchronization from the another UE 100 that receives the request signal, the UE 100 broadcasts a notification signal indicating that another UE 100 synchronized with the UE 100 is present.

The UE 100 may use the notification signal to instruct the another UE 100 to stop transmitting at least one of the response signal and the synchronization signal.

Further, when receiving the response signal from the another UE 100, the UE 100 may stop transmitting the request signal. This is because it is already confirmed that the another UE 100 is present in the neighborhood. Thus, it is possible to restrain a response from another UE 100 in the neighborhood.

Figure 8:
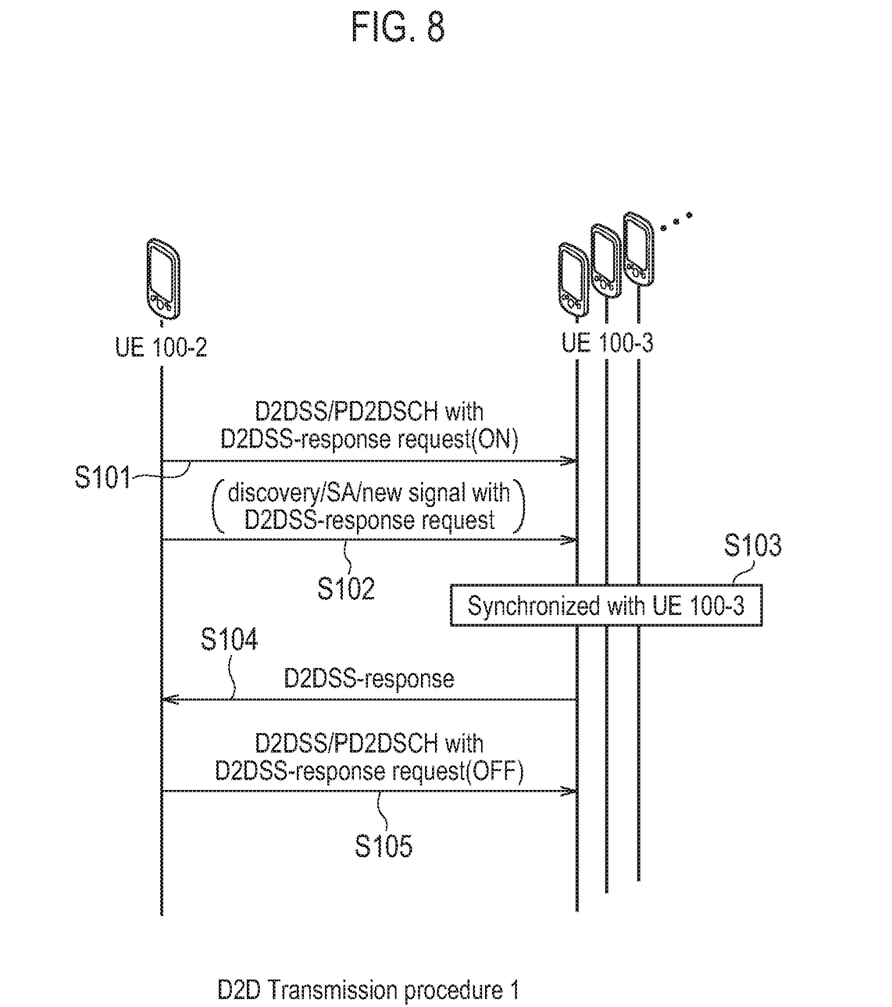
FIG. 8 is a sequence according to the first embodiment.

By using FIG. 8, a flow when whether another UE 100 is present in the neighborhood is confirmed by the UE 100 by using the request signal will be described.

The UE 100-2 broadcasts a request signal (D2DSS-response request (ON)) requesting a response from another UE 100 (S101).

The request signal may be transmitted by a synchronization signal (D2DSS), PD2DSCH (Physical D2D Shared Channel), a signal used for Discovery, a signal used for Scheduling Assignment, or data for D2D communication. The request signal may also be notified by a dedicated signal (S102).

The UE 100-3 that receives the request signal is synchronized with the UE 100-2 (S103). The UE 100-3, which is synchronized with the UE 100-2, is now capable of receiving a resource designation (Scheduling Assignment) for the D2D proximity service from the UE 100-2.

The UE 100-3 transmits the response signal indicating the synchronization (S104).

It is noted that a signal similar to the request signal may be used for the response signal.

The UE 100-2 that receives the response signal broadcasts a notification signal (D2DSS-response request (OFF)) indicating that the UE 100 (the UE 100-3 in the example of FIG. 8) synchronized with the UE 100-2 (S105) is present. The notification signal may be transmitted by the synchronization signal (D2DSS) or the PD2DSCH (Physical D2D Shared Channel). The another UE 100 is instructed by the notification signal to stop transmitting at least one of the response signal and the synchronization signal.

The synchronized UE 100-3 stops transmitting the response signal and the synchronization signal.

Second Embodiment

In a second embodiment, description of parts overlapping with the first embodiment will be omitted and a difference will be mainly described.

When the UE 100 is in the network coverage of the radio base station, if the UE 100 transmits a synchronization signal but does not receive a predetermined signal from another UE 100, then the UE 100 determines that another synchronized UE 100 is not present in the neighborhood.

When determining that another UE 100 is not present in the neighborhood, the UE 100 requests the eNB 200 to permit a transmission stop of the synchronization signal.

It is noted that when receiving, from another UE 100, neither the predetermined signal nor the synchronization signal, the UE 100 may determine that another synchronized UE 100 is not present in the neighborhood.

Further, the UE 100 may also determine that another UE 100 is not present in the neighborhood from a signal power intensity of the monitored synchronization signal and the predetermined signal.

When another synchronized UE 100 is present for the UE 100, the UE 100 receives, from the another UE 100, a signal indicating an implementation status of the D2D proximity service.

Here, when the UE 100 receives, from the another UE 100, a notification indicating being out of the network coverage, the UE 100 may determine that the another UE 100 and the UE 100 are synchronized.

Further, when the another UE 100 uses a radio resource for the D2D proximity service for the UE 100 that is out of the network coverage to transmit a signal for the D2D proximity service, the UE 100 may determine that the another UE 100 is synchronized with the UE 100.

Figure 9:
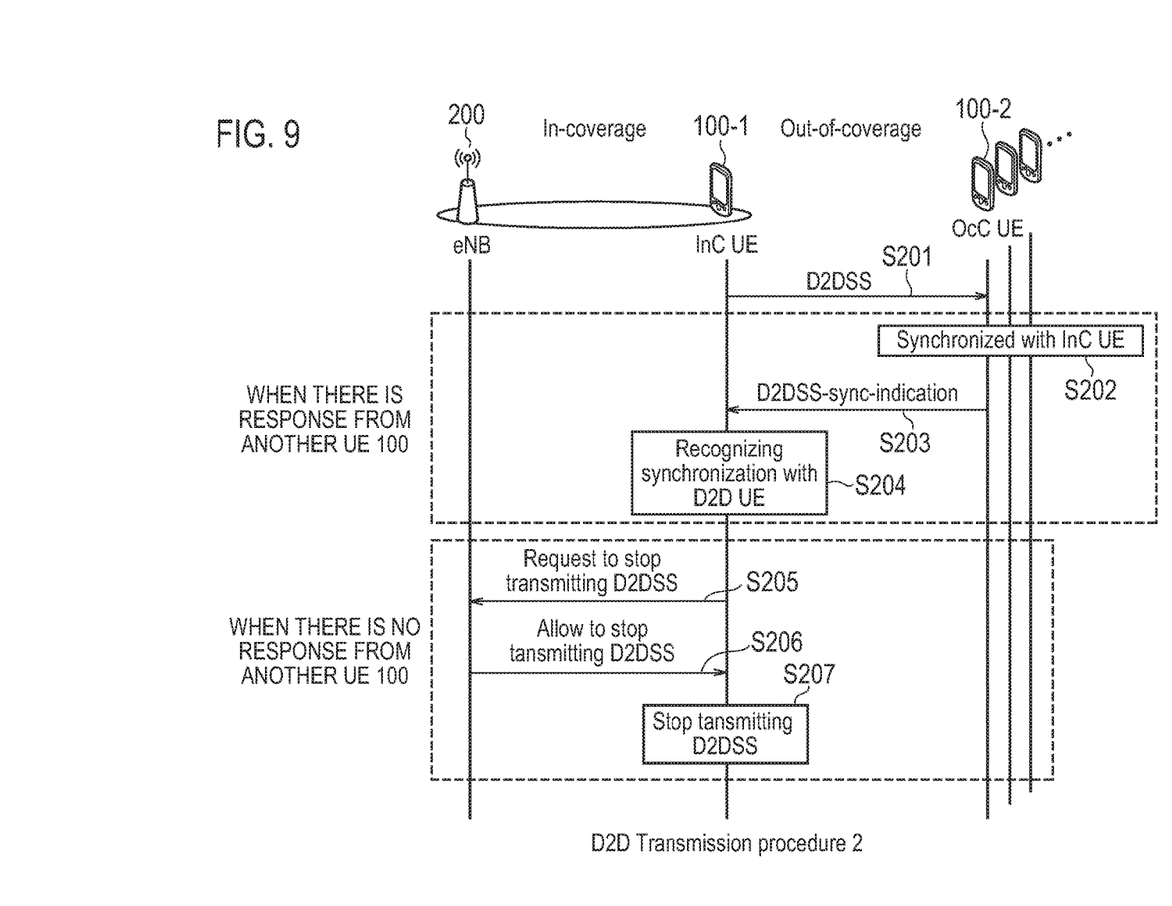
FIG. 9 is a sequence according to the second embodiment.

By using FIG. 9, an operation according to the present embodiment will be described.

(Case where Synchronized UE 100 is Present)

The UE 100-1 that exists in the network coverage transmits a synchronization signal (D2DSS) (S201). The synchronization signal is transmitted by broadcast.

The UE 100-2 that is out of the network coverage receives the synchronization signal to be synchronized with the UE 100-1 (S202).

The UE 100-2 transmits, to the UE 100-1, a notification (D2DSS-sync-indication) indicating that the synchronization signal is received for synchronization (S203). Here, the UE 100-2 may transmit the notification indicating the synchronization by using a signal used for Discovery, a signal used for Scheduling Assignment, or data for D2D communication.

(Case where Synchronized UE 100 is not Present)

When the UE 100-1 that exists in the network coverage transmits the synchronization signal (D2DSS) (S201) but does not receive a response signal from another UE 100, the UE 100-1 transmits, to the eNB 200, a signal requesting a transmission stop permission of the synchronization signal (S205 Request to stop transmitting D2DSS).

When receiving the signal requesting the transmission stop permission from the UE 100-1, the eNB 200 permits the UE 100 to stop the synchronization signal (S206 Allow to stop transmitting D2DSS).

After receiving the permission from the eNB 200, the UE 100-1 stops transmitting the synchronization signal.

Third Embodiment

In a third embodiment, description of parts overlapping with the first and second embodiments will be omitted and a difference will be mainly described.

When the UE 100 according to the present embodiment receives a synchronization signal from the eNB 200 or another UE 100, the UE 100 transmits a predetermined signal and starts the D2D proximity service even when the UE 100 itself does not transmit a synchronization signal.

This is because when receiving a synchronization signal from the eNB 200 or another UE 100, the UE 100 is capable of determining that it is highly likely that the another UE 100 may also be capable of implementing the D2D proximity service, that is, the another UE 100 may also be synchronized.

Fourth Embodiment

In a fourth embodiment, description of parts overlapping with the first to third embodiments will be omitted, and a difference will be mainly described.

When transmitting a synchronization signal continuously for a predetermined period, the UE 100 according to the present embodiment transmits a signal notifying a transmission stop of the synchronization signal and stops transmitting the synchronization signal.

This is to restrain an excessive power consumption by the synchronization signal transmission by the UE 100.

When an upper limit value is imposed on the number of times of the synchronization signal to be transmitted and the number of times of transmission reaches the upper limit value, the UE 100 may notify the transmission stop of the synchronization signal and stop the transmission of the synchronization signal.

The signal to notify the transmission stop may include a time at which the transmission of the synchronization signal is stopped.

Further, the signal to notify the transmission stop may be notified of the number of times of the synchronization signal to be transmitted. For example, the number of times of transmission includes information such as the number of times of the synchronization signal to be transmitted so far, the total number of times of the synchronization signal to be transmitted from the start of the transmission to the stop of the transmission, and the remaining number of times of the synchronization signal to be transmitted until the transmission stop.

The UE 100 may use the PD2DSCH (Physical D2D Shared Channel) to transmit the signal by which the transmission stop is notified.

A sequence of a specific synchronization signal (D2DSS sequence) may be defined, and an upper limit value of the number of times of transmission may be set to each D2DSS sequence. Each time the upper limit value of the number of times of the transmission of the D2DSS sequence is reached, the D2DSS sequence may be changed.

As the signal to notify the transmission stop, a transmission location of a specific synchronization signal may be defined and the transmission location of the synchronization signal may be changed based on the number of times of transmission.

Other Embodiments

It is noted that in the first to fourth embodiments, as a specific example of the predetermined signal, a control signal (Discovery signal) for discovering another user terminal, a radio resource designation signal (SA: Scheduling Assignment) for the D2D proximity service, user data (Communication Data) for the D2D proximity service, etc., are described; however, needless to say, the predetermined signal may be realized by using a control signal for another D2D proximity service and user data therefor.

In the above-described embodiments, although an LTE system is described as an example of a mobile communication system, the content according to the present embodiment is not limited to the LTE system, and may be applied to a system other than the LTE system.

Clearly, other modifications and manners of practicing this invention will occur readily to those of ordinary skill in the art in view of these teachings. The above description is illustrative and not restrictive. This invention is to be limited only by the following claims, which include all such modifications and manners of practice when viewed in conjunction with the above specification and accompanying drawings. The scope of the invention should, therefore, be determined not with reference to the above description, but instead should be determined with reference to the appended claims along with their full scope of equivalents.

INDUSTRIAL APPLICABILITY

As described above, according to the embodiment-based user terminal, in which it is possible to appropriately use the D2D proximity service, and thus, the user terminal is useful in the mobile communication field.

The invention claimed is:

1. A first user terminal, comprising:
   a receiver configured to directly receive a signal from a second user terminal in a case where the first user terminal is out of a network coverage,
   a controller configured to determine whether a received power of the signal from the second user terminal satisfies a predetermined condition, and
   a transmitter configured to:
   directly transmit a synchronization signal and D2D communication data, in the case where the first user terminal is out of the network coverage, in response to the received power not satisfying the predetermined condition, and
   directly transmit the D2D communication data without transmitting the synchronization signal, in the case where the first user terminal is out of the network coverage, in response to the received power satisfying the predetermined condition.

2. The first user terminal according to claim 1, wherein the signal is a first synchronization signal, and
   the synchronization signal transmitted by the transmitter is a second synchronization signal.

3. An apparatus for controlling a first user terminal, the apparatus comprising:
   a processor configured to perform processes of:
   directly receiving a signal from a second user terminal in a case where the first user terminal is out of a network coverage,
   determining whether a received power of the signal from the second user terminal satisfies a predetermined condition, and
   directly transmitting a synchronization signal and D2D communication data, in the case where the first user terminal is out of the network coverage, in response to the received power not satisfying the predetermined condition, and
   directly transmitting the D2D communication data without transmitting the synchronization signal, in the case where the first user terminal is out of the network coverage, in response to the received power satisfying the predetermined condition.

* * * * *